United States Patent [19]

Arora et al.

[11] Patent Number: 5,709,080
[45] Date of Patent: Jan. 20, 1998

[54] LEAK DETECTION METHOD AND APPARATUS FOR AN EXHAUST PURIFICATION SYSTEM

[75] Inventors: Amit Arora, Peoria; Ward L. Bivens, Lacon; Darren L. Krahn, Peoria; Randy N. Peterson, Edelstein, all of Ill.

[73] Assignee: Caterpillar Inc., Peoria, Ill.

[21] Appl. No.: 616,431

[22] Filed: Mar. 15, 1996

[51] Int. Cl.$^6$ ................................ F01N 3/18; F01N 3/36
[52] U.S. Cl. ........................... 60/274; 60/277; 60/301; 60/303
[58] Field of Search ......................... 123/520, 198 D; 60/274, 276, 277, 286, 301, 303; 73/40.5, 49.7, 118.1; 340/438, 439

[56] References Cited

U.S. PATENT DOCUMENTS

| | | | |
|---|---|---|---|
| 5,201,802 | 4/1993 | Hirota et al. | 60/301 |
| 5,325,663 | 7/1994 | Itoh | 60/277 |
| 5,388,401 | 2/1995 | Nishizawa et al. | 60/277 |
| 5,412,946 | 5/1995 | Oshima et al. | 60/303 |
| 5,460,141 | 10/1995 | Denz et al. | 60/520 |
| 5,474,050 | 12/1995 | Cook et al. | 60/520 |
| 5,483,942 | 1/1996 | Perry et al. | 123/520 |
| 5,490,381 | 2/1996 | Becker | 60/277 |
| 5,499,614 | 3/1996 | Busato et al. | 123/520 |
| 5,522,218 | 6/1996 | Lane et al. | 60/303 |
| 5,542,292 | 8/1996 | Schneider et al. | 60/277 |
| 5,611,198 | 3/1997 | Lane et al. | 60/303 |

*Primary Examiner*—Willis R. Wolfe
*Attorney, Agent, or Firm*—David M. Masterson

[57] ABSTRACT

A method and apparatus for determining a leak in an HC fluid supply of an exhaust purification system for an engine is disclosed. The fluid supply includes an injector that injects an amount of a NOx reducing fluid, a tank that holds the NOx reducing fluid, and a pump that pressurizes the NOx reducing fluid. The system fluid pressure is read before and after the pump is shut off. The pressure readings are compared and the exhaust purification system is turned off in response to the difference between the pressure readings being greater than a predetermined value.

9 Claims, 3 Drawing Sheets

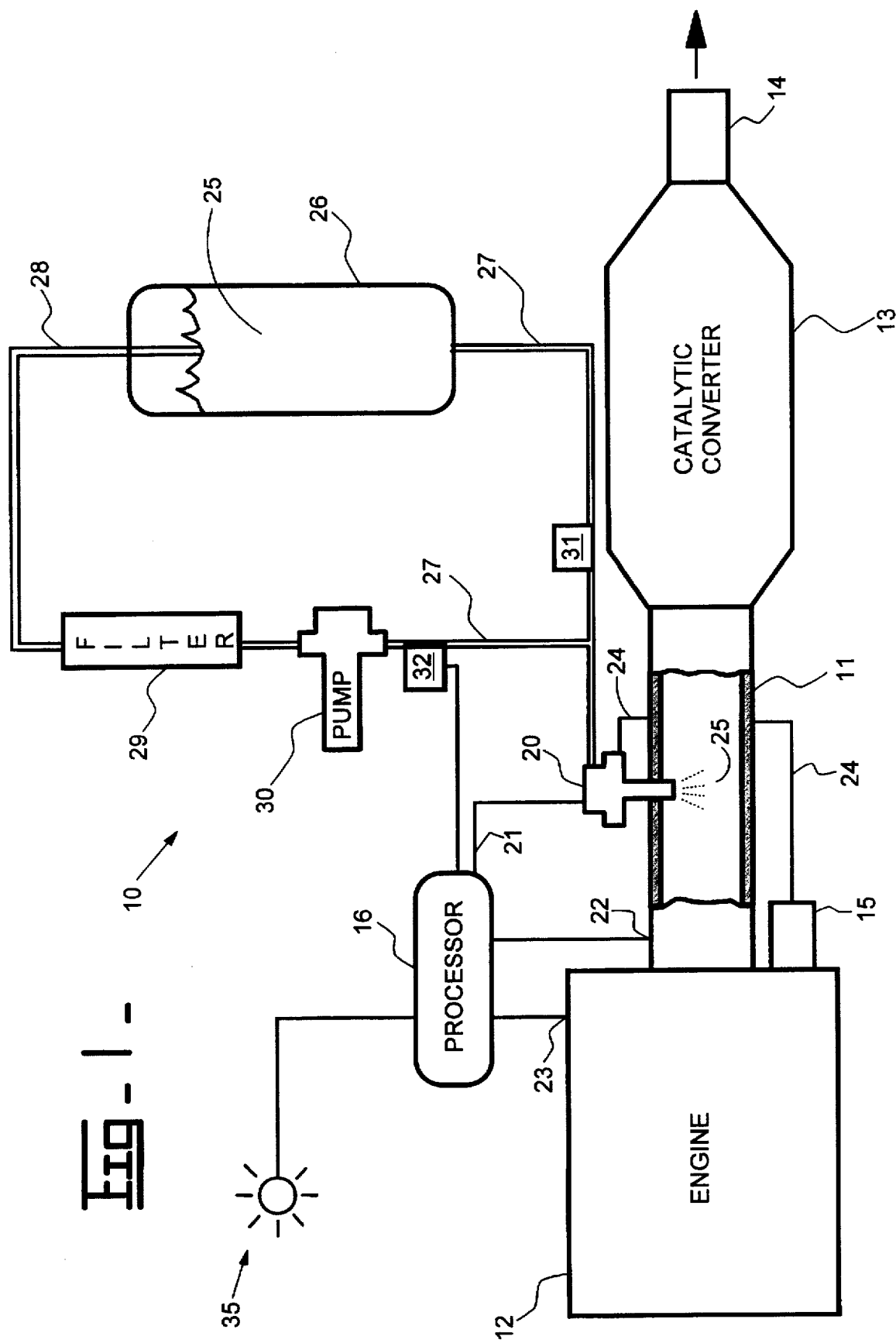

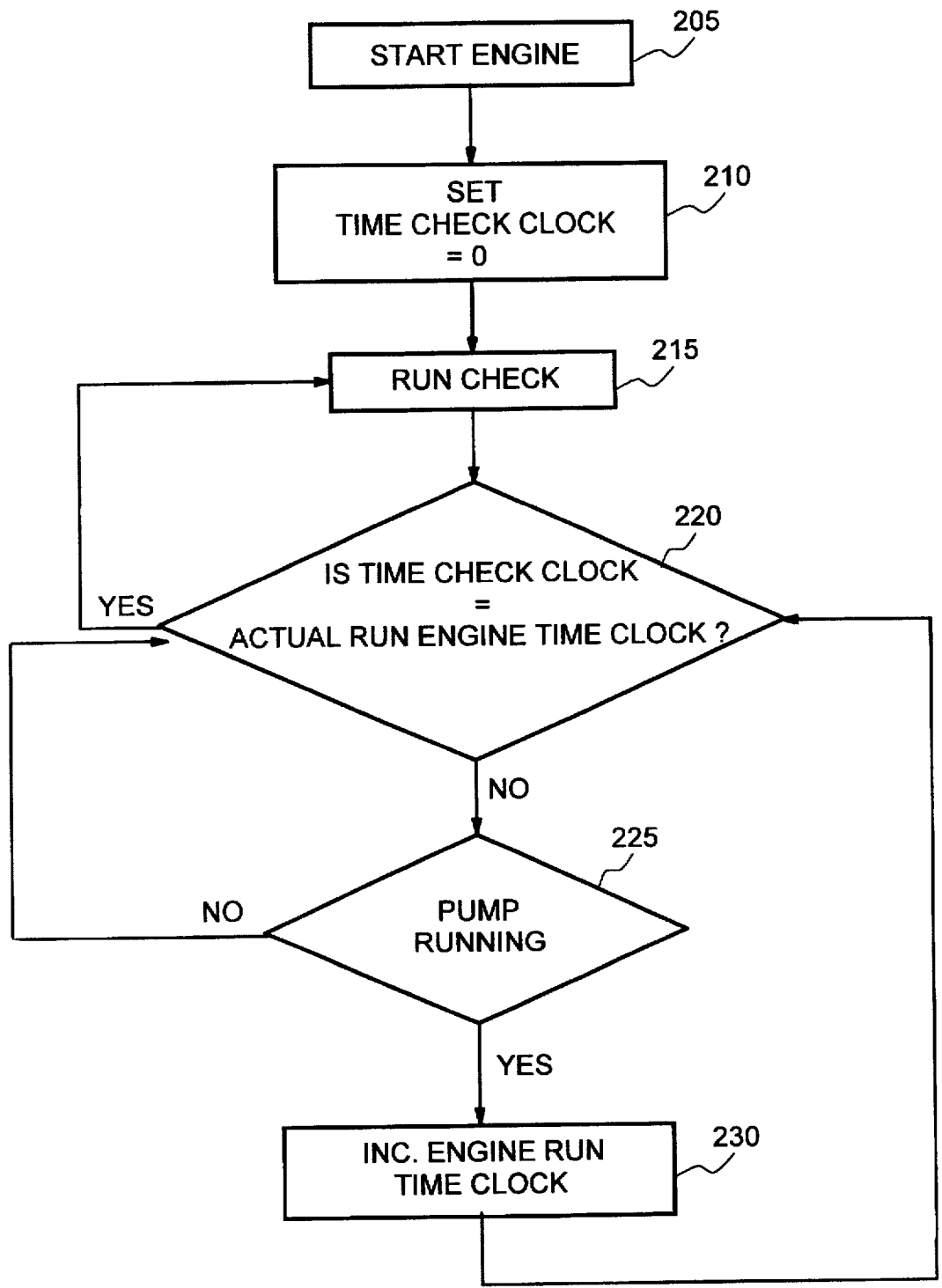
Fig-2-

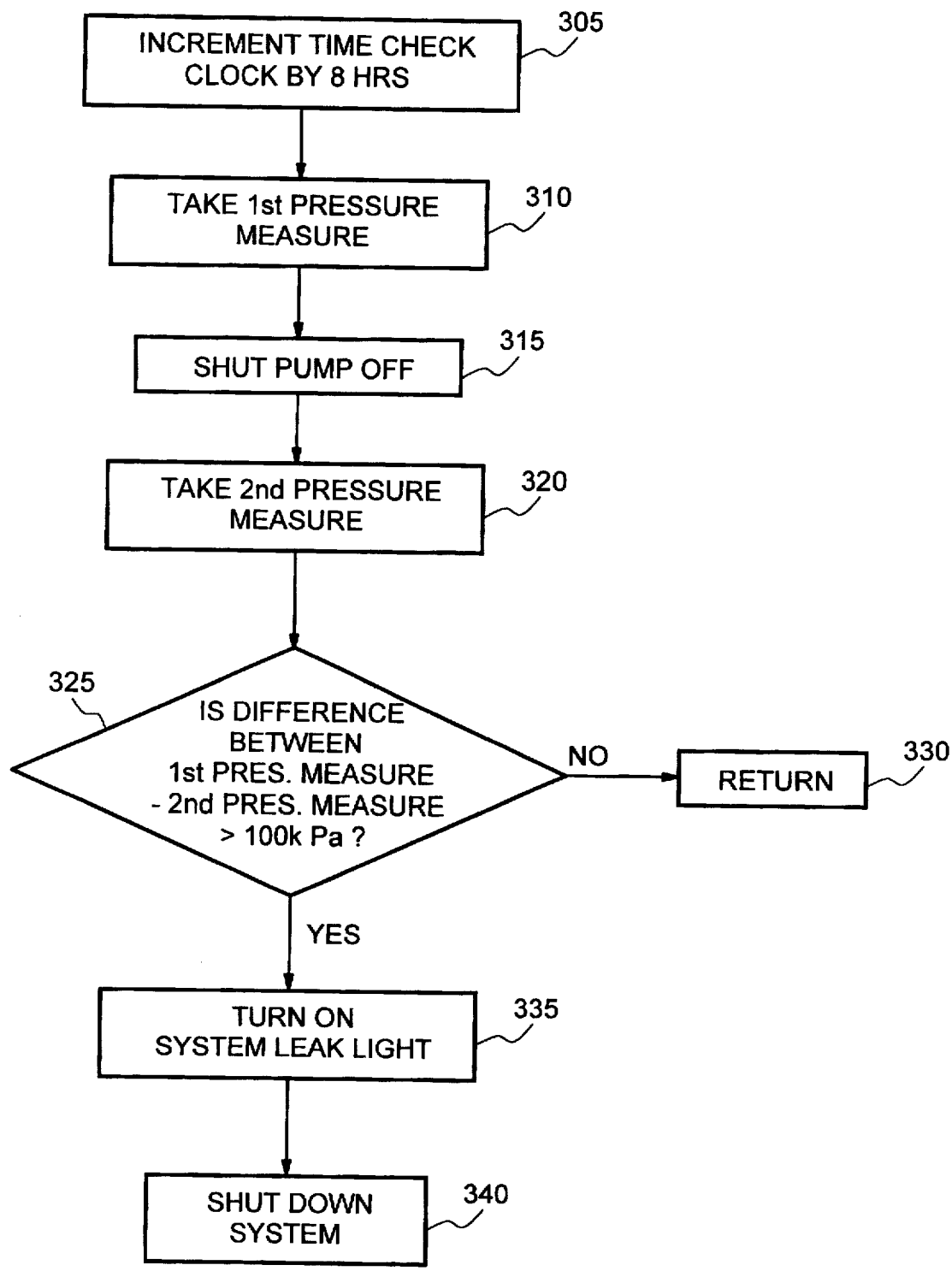
Fig_3_

LEAK DETECTION METHOD AND APPARATUS FOR AN EXHAUST PURIFICATION SYSTEM

TECHNICAL FIELD

This invention relates generally to a method for detecting leaks in a fluid system and, more particularly, to a method for detecting leaks in an HC supply of an exhaust purification system.

BACKGROUND ART

Due primarily to federal regulations, engine manufacturers are being forced to reduce the amount of harmful compounds in the combustion exhaust. In the case of lean burning engines, including diesel and certain spark igniting engines, a hydrocarbon (HC) species must often be injected into the exhaust to effectively reduce the NOx concentrations. In other words, in combustion exhaust purification systems having an oxygen environment above 3% concentration, some type of reducing agent, usually a hydrocarbon compound, must be introduced into the exhaust in order to achieve acceptable reduction levels of NOx compounds. The HC may be introduced in many ways, but it typically is continuously injected into the exhaust upstream from an appropriate deNOx catalytic converter.

One example of an exhaust purification system is disclosed in U.S. Pat. No. 5,522,218. Here, the exhaust purification system uses microprocessor control to intermittently inject an optimal amount of an NOx reducing fluid into the exhaust passageway of an engine. The system periodically senses the engine operating condition and the exhaust temperature, and calculates the appropriate injection amount. With appropriate deNOx and oxidation catalysts located downstream from the injector, the exhaust purification system reduces NOx content of the exhaust while maintaining HC emissions at acceptable levels.

However, it is important to detect any leaks that occur in the system to insure that the system is operating properly.

DISCLOSURE OF THE INVENTION

In one aspect of the present invention, a method and apparatus for determining a leak in an HC fluid supply of an exhaust purification system for an engine is disclosed. The fluid supply includes an injector that injects an amount of a NOx reducing fluid, a tank that holds the NOx reducing fluid, and a pump that pressurizes the NOx reducing fluid. The system fluid pressure is read before and after the pump is shut off. The pressure readings are compared and the exhaust purification system is turned off in response to the difference between the pressure readings being greater than a predetermined value.

BRIEF DESCRIPTION OF THE DRAWINGS

For a better understanding of the present invention, reference may be made to the accompanying drawings in which:

FIG. 1 is a schematic diagram of an exhaust purification system;

FIG. 2 is a flow chart illustrating a high level program control that calls a leak detection subroutine; and FIG. 3 is a flow chart illustrating a low level program control of the leak detection subroutine.

BEST MODE FOR CARRYING OUT THE INVENTION

Referring now to FIG. 1, an exhaust gas purification system 10 is shown in use with an internal combustion engine 12. Exhaust exits engine 12 via exhaust passageway 11 on its way to catalytic converter 13 and eventually exits at outlet 14. Catalytic converter 13 includes a deNOx catalyst, such as zeolite ZSM5 or a precious metal based catalyst, or a combination of both. In many applications it may also be desirable to include an oxidation catalyst of a type known in the art downstream from the deNOx catalyst. For a lean burn diesel engine, the inclusion of a three way catalyst between the deNOx and oxidation catalyst may effectively increase reduction of undesirable nitrogen compounds present after the exhaust passes through the deNOx catalyst. As exhaust leaves engine 12, an amount of HC 25 is injected into exhaust passageway 11 via injector 20. This additional HC allows reduction of upwards of 80% of the NOx compounds after passage through the deNOx catalyst. Next, the exhaust encounters the oxidation catalyst (not shown) which serves to purify the exhaust of most of the remaining unburned HC. The exhaust exiting outlet 14 has greatly reduced NOx content while also achieving satisfactory levels of HC emission.

Because temperatures in a diesel exhaust environment can reach 650° C. without failure, the engine's cooling system 15 circulates coolant via pipe 24 to continuously cool injector 20. The injector 20 is designed to have the ability to introduce an optimal amount of HC 25, which is dependent upon the exhaust temperature and the operating condition of engine 12. The term optimal amount means that amount which will produce the greatest overall NOx reduction for a given exhaust temperature and operating condition without unnecessarily increasing the amount of HC being injected.

This is accomplished by utilizing a microprocessor 16 that has the ability to control injector 20 via connection 21. Microprocessor 16 periodically determines the exhaust temperature via temperature sensor 22, and monitors the operating condition of engine 12 via sensor 23. In motor vehicle applications, it may be desirable for microprocessor 16 to periodically determine the operating condition of the complete vehicle, such as engine rpm, transmission gear and vehicle speed. These additional sensors would be desirable in those cases where exhaust gas purification was shown to be sensitive to the vehicle's operating conditions as well as the particular engine's operating conditions.

HC 25, which is preferably ethanol but could be any suitable NOx reducing fluid known in the art, is stored in tank 26 and carried to injector 20 via pipe 27. An HC supply pump 30 serves to pressurize pipe 27 while pressure regulator 31 maintains the fluid pressure on injector 20 at a predetermined level. A pressure sensor 32 senses the fluid pressure and delivers a pressure signal to the microprocessor 16. HC 25 passes through filter 29 on its way to injector 20, with a portion being recirculated through regulator 31 back to tank 26 when system 10 is in operation.

The present invention is directed toward a method of determining whether a leak is occurring with the HC supply of an exhaust gas purification system. If a leak is detected in the HC supply, the exhaust gas purification system will be shut down and a "System Leak" alert indicator light will be energized. The leak detection method of the present invention is preferably carried out by a computer program, which is stored in either ROM or RAM of the microprocessor 16. Such a program is amply depicted by the flowcharts shown in FIGS. 2 and 3.

Referring to FIG. 2, a high level subroutine is shown. After the engine has started (205), a "time check" clock is set to zero (210). Then a "run check" subroutine is called (215). The "run check" subroutine represents the portion of the program that actually determines whether a system leak is occurring in the HC supply. As will become apparent from a reading of the flowcharts, the "run check" subroutine is first called after the engine has started, then every 8 hours thereafter.

Referring now to FIG. 3, the "run check" subroutine will be described. First, the "time check" clock is incremented by 8 hours (305). Then, the system pressure is read (310) and the HC supply pump is shut off (315) for a predetermined time period, e.g., 30 seconds (320). After the predetermined time period elapses, a second pressure reading is made (320). The program then determines if the pressure difference between the first and second reading is greater than a predetermined value, e.g., 100 kPa (325). If the pressure difference is less than 100 kPa, then the system is considered to be not leaking and the program control returns to the main subroutine (330). However, if the pressure difference is determined to be greater than 100 kPa, then the system is considered to be leaking. Consequently, the "System Leak" light is illuminated (335) and the system is shut down (340). Thus, if the HC supply has malfunctioned, the appropriate program flags and external indicators are activated to alert an attendant that the exhaust purification system is in need of maintenance.

Adverting back to FIG. 2, at block 215, the program control proceeds to the first decisional block 220 where the program determines whether the engine has been running for 8 hours. Thus, the program control compares the "time check" clock to an "actual engine run time" clock. The "actual engine run time" clock represents the actual time that the engine has been running. If the representative times of the two program clocks are the same, that is, the engine has been running for an interval of 8 hours, then the "run check" subroutine is called. However, if representative times of the two program clocks are the same, then the program determines whether the HC supply pump is operating (225) to determine if the engine is running. If the HC supply pump is operating, then the program increments the "actual engine run time" clock (230) and returns to decision block 220. However, if the HC supply pump is not operating, then the program control returns back to block 220.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

The present invention is used to determine whether a leak is occurring with the HC supply of an exhaust gas purification system. As apparent from the flowcharts in FIGS. 2 and 3, the present invention performs an HC supply leak check first when the engine has started, then once every eight hours after the engine has been running continuously. To accomplish this, the system pressure is first measured just prior to the HC supply pump being shut off, and again 30 seconds after the supply pump has been shut off. If the pressure difference between the two readings is greater than 100 kPa, then the "System Leak" alert indicator light is illuminated and the exhaust gas purification system is shut down.

Other aspects, objects and advantages of the present invention can be obtained from a study of the drawings, the disclosure and the appended claims.

We claim:

1. A method for determining a leak in an engine exhaust purification system containing a NOx reducing fluid, the system including an injector that injects an amount of a NOx reducing fluid, a tank that holds the NOx reducing fluid, and a pump that pressurizes the NOx reducing fluid, the method comprising the steps of:

monitoring the system fluid pressure while the pump is operating;

shutting the pump off for a predetermined time period and thereafter monitoring the system fluid pressure;

comparing the pressure difference while the pump is operating and while the pump is shut off; and turning the system off in response to the pressure difference being greater than a predetermined value.

2. A method, as set forth in claim 1, including the step of shutting the pump off for a period of 30 seconds and thereafter monitoring the system fluid pressure.

3. A method, as set forth in claim 2, wherein the fluid supply system is turned off in response to the pressure difference being greater than 100 kPa.

4. A method, as set forth in claim 3, wherein the exhaust purification system includes a system leak light and including the step of illuminating the system leak light in response to the pressure difference being greater than 100 kPa.

5. A method, as set forth in claim 4, including the step of repeating the steps of claims 1–4 when the engine is first started and every eight hours while the engine is operating.

6. An apparatus for determining a leak in an engine exhaust purification system containing a NOx reducing fluid, the system including an injector that injects an amount of a NOx reducing fluid, a tank that holds the NOx reducing fluid, and a pump that pressurizes the NOx reducing fluid, comprising:

means for detecting the system fluid pressure and producing a pressure signal;

means for shutting the pump off for a predetermined time period;

means for reading the pressure signal before and after the pump being shut off, comparing the two pressure readings, and turning the system off in response to the pressure reading differential being greater than a predetermined value.

7. An apparatus, as set forth in claim 6, wherein the pump is shut off for a period of 30 seconds.

8. An apparatus, as set forth in claim 7, wherein the fluid supply system is turned off in response to the pressure reading differential being greater than 100 kPa.

9. An apparatus, as set forth in claim 8, wherein the exhaust purification system includes a system leak light and including means for illuminating the system leak light in response to the pressure reading differential being greater than 100 kPa.

* * * * *